United States Patent
Fukui et al.

(10) Patent No.: US 8,291,755 B2
(45) Date of Patent: Oct. 23, 2012

(54) TIRE AIR-PRESSURE DETECTION DEVICE

(75) Inventors: Kunihiko Fukui, Saitama (JP); Masakuni Ando, Saitama (JP); Koji Suzuki, Saitama (JP); Katsuhisa Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 514 days.

(21) Appl. No.: 12/569,099

(22) Filed: Sep. 29, 2009

(65) Prior Publication Data

US 2010/0095756 A1  Apr. 22, 2010

(30) Foreign Application Priority Data

Oct. 16, 2008  (JP) .................................. 2008-267644

(51) Int. Cl.
*G01M 17/02* (2006.01)
*B60C 23/02* (2006.01)

(52) U.S. Cl. .......................... 73/146.8; 73/146
(58) Field of Classification Search .................. None
See application file for complete search history.

(56) References Cited

U.S. PATENT DOCUMENTS

| | | | | |
|---|---|---|---|---|
| 5,844,131 | A * | 12/1998 | Gabelmann et al. | 73/146.8 |
| 6,055,855 | A * | 5/2000 | Straub | 73/146.8 |
| 6,568,259 | B2 * | 5/2003 | Saheki et al. | 73/146 |
| 6,591,672 | B2 * | 7/2003 | Chuang et al. | 73/146.8 |
| 6,694,807 | B2 * | 2/2004 | Chuang et al. | 73/146.5 |
| 6,805,000 | B1 * | 10/2004 | Sheikh-Bahaie | 73/146.8 |
| 6,945,104 | B2 * | 9/2005 | Uleski | 73/146.8 |
| 7,040,155 | B1 * | 5/2006 | Lundell et al. | 73/146.8 |
| 7,082,817 | B1 * | 8/2006 | Yu et al. | 73/146 |
| 7,204,136 | B2 * | 4/2007 | Thrush et al. | 73/146.2 |
| 7,228,731 | B2 * | 6/2007 | Yamagiwa et al. | 73/146 |
| 7,377,156 | B1 * | 5/2008 | Mattson et al. | 73/146 |
| 2006/0071765 | A1 * | 4/2006 | Lin | 340/442 |
| 2006/0075812 | A1 | 4/2006 | Luce | |
| 2006/0162436 | A1 | 7/2006 | Ito et al. | |

FOREIGN PATENT DOCUMENTS

JP  2004-317198  11/2004

* cited by examiner

*Primary Examiner* — Lisa Caputo
*Assistant Examiner* — Jermaine Jenkins
(74) *Attorney, Agent, or Firm* — Squire Sanders (US) LLP

(57) ABSTRACT

A method and apparatus in accordance with embodiments of the invention includes a tire pressure detection device comprising an elongated casing having a first casing portion and a second casing portion, configured to house a pressure sensor and the battery therein. The elongated casing also includes a mounting hole for accommodating a connection member configured to connect the casing to a tire valve. The mounting hole is disposed, in one embodiment, and at approximately longitudinal center portion thereof. The first casing portion and the second casing portion are joined to each other by joint portions comprising a hook formed on one of the first casing portion and the second casing portion, and a hook hole formed in another of the first casing portion and the casing portion. The joint portions are located around the mounting hole and both longitudinal ends of the casing. The casing is configured such that a tire valve penetrates a rim of the tire wheel from an outside to an inside thereof.

17 Claims, 8 Drawing Sheets

21: FRONT-WHEEL TRANSMITTER  
22: REAR-WHEEL TRANSMITTER  
26: METER CONTROLLER  
27: COMMUNICATION CONTROLLER  
232: RF CIRCUIT  
233: MICROCOMPUTER  
234: POWER SOURCE  
235: INPUT/OUTPUT CIRCUIT

TIRE AIR-PRESSURE DETECTION DEVICE

BACKGROUND

1. Field

Embodiments of the present invention relate to tire air-pressure detection devices, and more particularly to tire air-pressure detection devices which have a holding structure capable of withstanding even a large centrifugal force generated due to high-speed rotation of a wheel.

2. Description of Related Art

There has been known a tire air pressure monitoring system which can check an air pressure of each tire from a driver seat by constantly measuring air pressures of tires. Japanese Patent Publication JP-A-2004-317198 ('JP '198) proposes an air pressure sensor which is mounted on a portion of a rim of a tire wheel, wherein a mounting portion on an outer casing of the air pressure sensor is formed in a shape which conforms to a curvature shape of the rim, and the mounting portion is mounted on a portion of the rim by way of an adhesive means.

In such an air pressure sensor, a battery and a detector (sensor portion) are housed in a resin casing, and an outer casing of the resin casing which is split in two is formed by assembling two split casings using a large number of small bolts or is formed by integral molding.

SUMMARY

A method and apparatus in accordance with embodiments of the invention includes a tire pressure detection device comprising an elongated casing having a first casing portion and a second casing portion, configured to house a pressure sensor and the battery therein. The elongated casing also includes a mounting hole for accommodating a connection member configured to connect the casing to a tire valve. The mounting hole is disposed, in one embodiment, at approximately longitudinal center portion thereof. The first casing portion and the second casing portion are joined to each other by joint portions comprising a hook formed on one of the first casing portion and the second casing portion, and a hook hole formed in another of the first casing portion and the casing portion. The joint portions are located around the mounting hole and both longitudinal ends of the casing. The casing is configured such that a tire valve penetrates a rim of the tire wheel from an outside to an inside thereof.

DETAILED DESCRIPTION

When a vehicle travels at a high speed, a large centrifugal force acts on an air-pressure detection device. Accordingly, as in the case of the device described in JP '198, the split casings are assembled together using the large number of small bolts or the outer casing is formed by integral molding. However, when the large number of small bolts are used, a weight of the air-pressure detection device is increased so that a centrifugal force is increased. Accordingly, there exists a drawback that it is necessary to further strengthen an adhering portion which fixes the casings to the rim. Further, when the number of small bolts is increases, the number of assembling man-hours is also increased. On the other hand, when the split-type casing is formed integrally, it is difficult to disassemble the casing thus giving rise to a drawback that the exchange of a battery and the maintenance of a sensor portion become inconvenient.

It is an object of the present invention to provide a tire air-pressure detection device having a casing which can hold integrity by withstanding a large centrifugal force while using a split-type casing.

In one embodiment, a technical feature of the present invention resides in that, in a tire air-pressure detection device in which a pressure detection unit which includes a pressure sensor for detecting an air pressure of a tire, a battery for supplying operational electric power to the pressure sensor, an elongated casing formed of a first casing portion and a second casing portion and housing the pressure sensor and the battery therein, and a tire valve mounted on a rim of a tire wheel in a state that the tire valve penetrates the rim from the outside to the inside and connected to the casing is mounted on the rim of the tire wheel by way of the tire valve, the casing has a mounting hole through which a connection member for connecting the casing to the tire valve penetrates at an approximately longitudinal center portion thereof. The first casing portion and the second casing portion are joined to each other by joint portions each of which is include of a hook formed on one of the first casing portion and the second casing portion and a hook hole formed in the other of the first casing portion and the second casing portion. The joint portions are arranged around the mounting hole and at both longitudinal ends of the casing.

In certain embodiments, a technical feature of the invention resides in that the pressure sensor is housed in one longitudinal side of the casing and the battery is housed in another longitudinal side of the casing with the mounting hole sandwiched between the pressure sensor and the battery. The joint portions are formed such that the joint portions sandwich the pressure sensor and the battery therebetween in the longitudinal direction of the casing.

In certain embodiments, a technical feature of the present invention resides in that the joint portions of the casing are arranged along the longitudinal direction of the casing and on a straight line at a widthwise center portion.

Another technical feature of certain embodiments of the invention resides in that the pressure detection unit can be connected to the tire valve such that the pressure detection unit is positioned in a spaced-apart manner from a mounting portion of the tire valve on the rim by a predetermined distance, and the predetermined distance is set so as to prevent the pressure detection unit from projecting outwardly from outermost peripheries of the left and right rims of the tire wheel.

Yet another technical feature of embodiments of the present invention resides in that the pressure detection unit is mounted on the rim of the tire wheel by way of the tire valve such that the pressure sensor is positioned on a front side with respect to an advancing rotational direction of the tire wheel, and the battery is positioned on a rear side with respect to the advancing rotational direction of the tire wheel.

In other embodiments, a technical feature of the invention resides in that the pressure detection unit is arranged at the approximate center in the widthwise direction of the tire wheel.

Another technical feature of certain embodiments of the invention resides in that the connection member is a nut which is threadedly engaged with a threaded portion formed on an outer periphery of a cylindrical body of the tire valve. The nut can include a flange portion formed on a head portion thereof and a cylindrical portion which extends from the flange portion. The cylindrical portion is slidably fitted in a mounting hole formed in the casing, and a coil spring, which acts to move the pressure detection unit away from the rim, is provided between the rim and the pressure detection unit.

Another technical feature of certain embodiments of the invention resides in that the joint portion arranged around the mounting hole and the joint portion arranged at both longitudinal ends of the casing are provided at positions different from each other in the height direction of the casing.

According to the various embodiments of the invention, in assembling upper and lower split-type casings of the pressure detection unit into an integral assembled body, by engaging the hooks with the hook holes in the joint portions provided at the mounting hole formed in the center portion of the casing and at both longitudinal ends of the casing, the first casing portion and the second casing portion can be firmly assembled together.

Since the joint portions are provided around the mounting hole formed in the center portion of the casing, which is liable to be influenced by vibrations from the wheel and at both longitudinal ends of the casing where the first casing portion and the second casing portion are liable to be separated from each other by receiving a centrifugal force, it is possible to effectively assemble the first casing portion and the second casing portion with a reduced number of joint portions. Accordingly, it is possible to ensure a high joining force between the first casing portion and the second casing portion while decreasing the number of parts.

According to another embodiment, the joint portions are formed such that the joint portions sandwich the pressure sensor and the battery, which are heavy objects, arranged on both sides of the mounting hole therebetween in the longitudinal direction of the casing. Due to such a constitution, it is possible to join the first casing portion and the second casing portion more firmly against a centrifugal or centripetal force which could act on the battery and the pressure sensor. Particularly, the joint portions are set at end portions of the pressure detection unit in the longitudinal direction which are positions where the first casing portion and the second casing portion are liable to most influenced by a centrifugal force. Therefore, the joint portions can remain secure against centrifugal or centripetal force which tends to separate the first casing portion and the second casing portion.

According to another embodiment, the joint portions can be arranged at the widthwise center portion of the casing and hence, a moment of force which acts on the joint portions in the widthwise direction of the casing can be made uniform whereby it is possible to join the first casing portion and the second casing portion with a small joining force.

According to another embodiment, the pressure detection unit can indirectly receive vibrations of the tire wheel by way of the tire valve and hence, the resistance against the vibrations of the pressure detection unit can be increased. Further, the pressure detection unit does not project outwardly from outermost peripheries of the tire wheel. Therefore, the pressure detection unit does not interfere with the tire at the time of mounting or dismounting tire for maintenance.

According to yet another embodiment, the battery, which is an object which can be heavier than the pressure sensor, is arranged on the rear side with respect to the advancing rotational direction of the tire wheel. Therefore, it is possible to reduce vibrations of the pressure detection unit during the rotation of the tire wheel at the time of accelerating a vehicle, for example.

According to another embodiment, the distances between the pressure detection unit and both sides of the rim are ensured even when the pressure detection unit is vibrated. As a result, the pressure detection unit hardly comes into contact with the rim. Further, it is possible to easily ensure an operation space between the rim and the pressure detection unit during performing maintenance.

According to another embodiment, the pressure detection unit is resiliently mounted on the tire valve by a coil spring. Therefore, it is possible to allow the rim to hold the pressure detection unit more reliably against the vibrations of the tire wheel.

According to another embodiment, it is possible to enhance a joining force of the joint portions even in the height direction of the casing.

Figure 1:
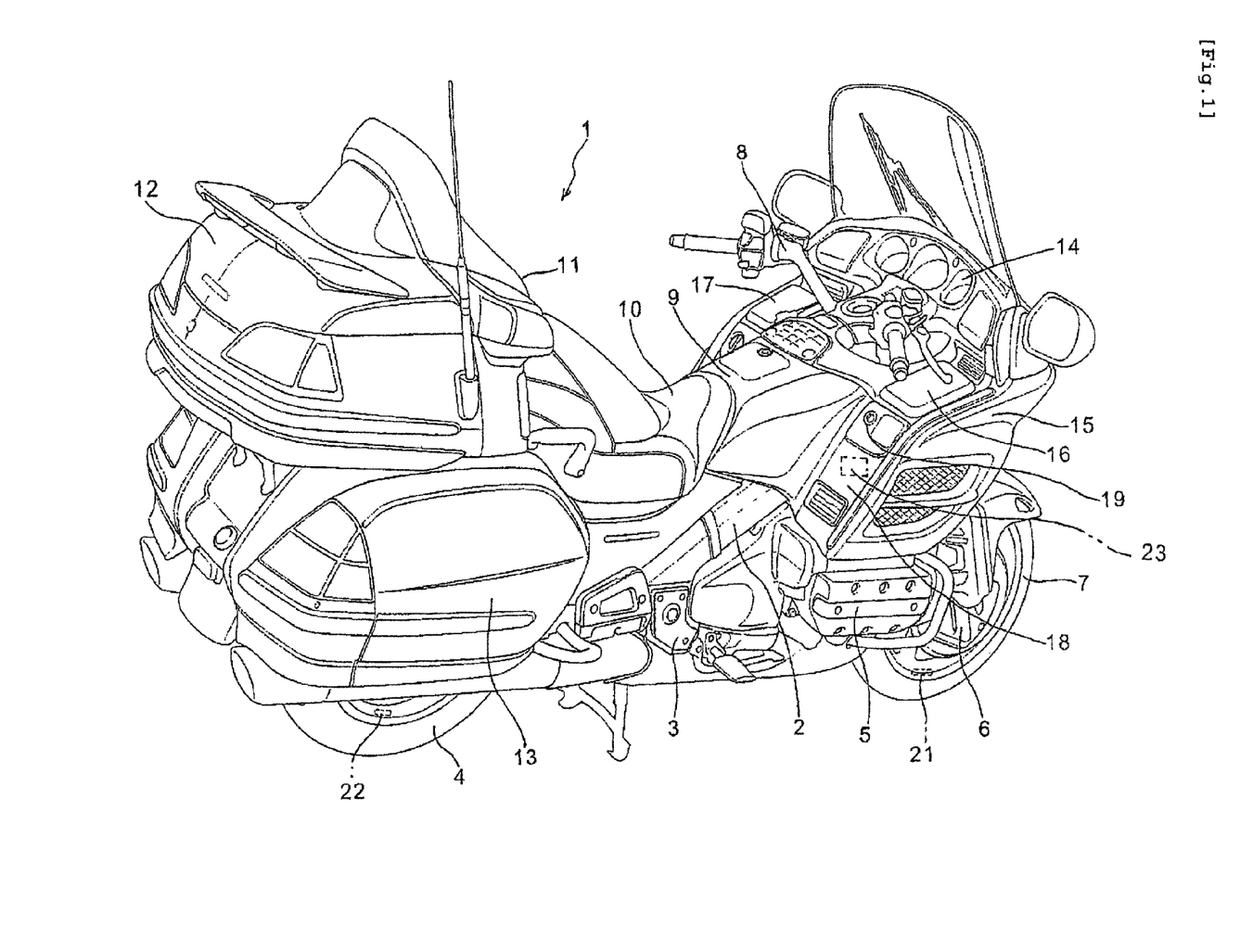
FIG. 1 illustrates a perspective view of a motorcycle including a tire air-pressure detection device according to an embodiment of the present invention.
Figure 2:
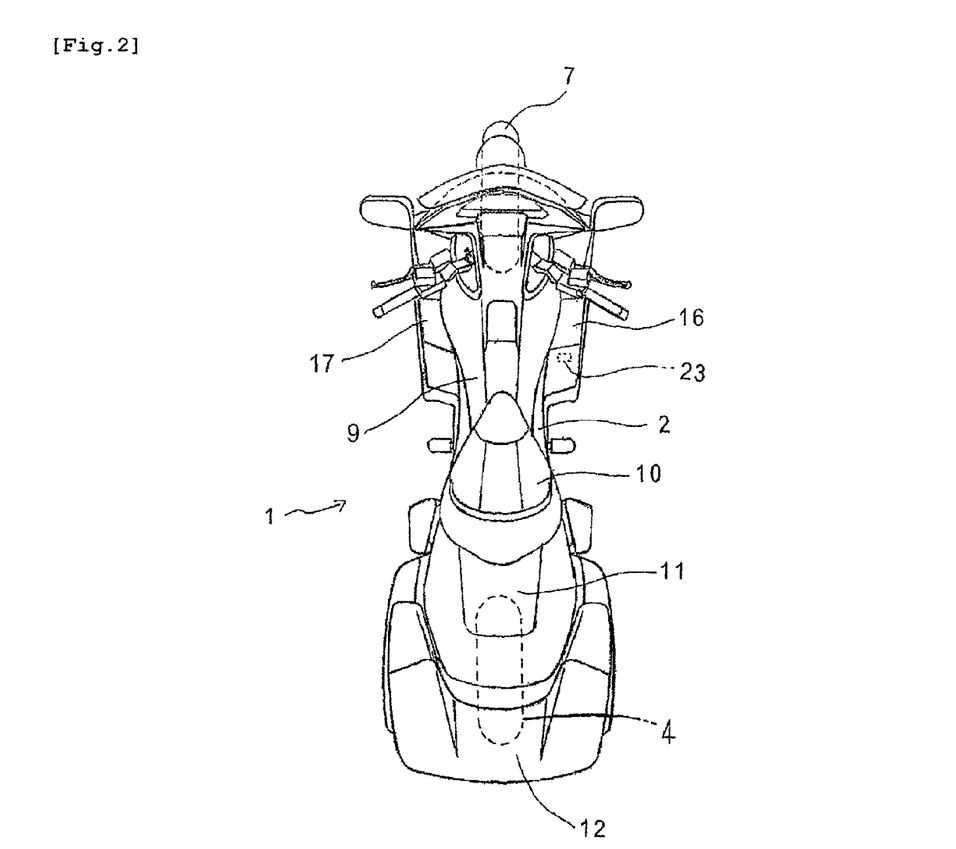
FIG. 2 is a plan view of a motorcycle including a tire air-pressure detection device of an embodiment according to the present invention.

Hereinafter, an embodiment of the present invention is explained in conjunction with the drawings. FIG. 1 is a right rear perspective view of a motorcycle on which a tire air-pressure detection device according to an embodiment of the present invention is mounted, and FIG. 2 is a plan view of the motorcycle. The motorcycle 1 includes a pair of left and right tube frames 2 extending in the laterally oblique downward and rearward direction from a head pipe, not shown in the drawing as a main frame. The tube frames 2 expand in the vehicle-body width direction from the head pipe and, thereafter, extend rearwardly and can be connected to a pivot plate 3. The pivot plate 3 is a member which holds a shaft for pivotally supporting a rear wheel 4 in a vertically swingable manner. An engine 5 can be arranged below the tube frames 2. The engine 5, which can function as a reinforcing member per se, is connected to the tube frames 2.

A front wheel 7 is rotatably supported on a lower end of a front fork 6 which is rotatably supported on the head pipe. A steering handle 8 is mounted on an upper portion of the front fork 6. Further, a fuel tank 9 is arranged above the engine 5, and a rider seat 10 and a pillion or passenger seat 11 are arranged behind the fuel tank 9. A main trunk 12 is arranged behind the pillion seat 11, and side bags 13 are mounted on left and right sides below the main trunk 12.

A meter unit 14 or gauge cluster is arranged in front of the steering handle 8, and a front cowl 15 is provided so as to cover the steering handle 8 and the front portion of the fuel tank 9. Accommodation pockets 16, 17 having a lid respectively are provided on left and right sides of the front cowl 15 in a state that the accommodation pockets 16, 17 sandwich the steering handle 8. On a surface 18 of the front cowl 15 which is contiguously formed with a surface of the front cowl 15 on which the lid of the housing pocket 16 is arranged in the oblique rearward and downward direction, an open/close key 19 of the housing pocket 16 is arranged. Further, on a back surface of this surface 18, that is, on an inner side of the front cowl 15, a receiver 23 which receives a tire air pressure signal transmitted from a pressure detection unit or transmission device is mounted.

Transmitters 21, 22, which measure a tire air pressure of a front wheel 7 and a tire air pressure of a rear wheel 4 and transmit a measurement result and an ID, are mounted on rims of the front wheel 7 and the rear wheel 4 respectively. Mounting of the transmitters 21, 22 being explained in detail later.

Figure 3:
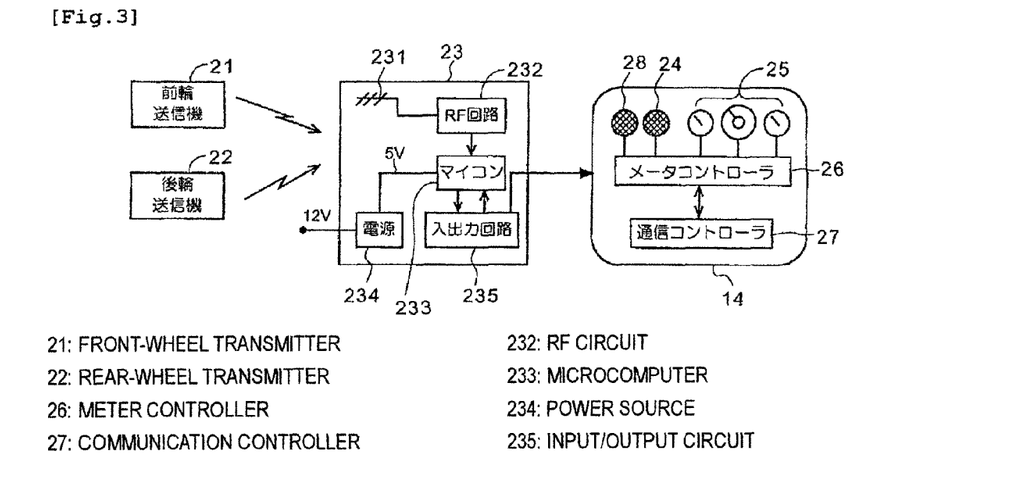
FIG. 3 illustrates a system constitutional view of the tire air-pressure detection device according to an embodiment of the invention.

FIG. 3 is a system constitutional view of the tire air-pressure detection device. The tire air-pressure detection device includes the transmission device which can include the front-wheel transmitter 21 and the rear-wheel transmitter 22 which are mounted on the front wheel 7 and the rear wheel 4 respectively, the receiver 23 which receives information indicative of a state of a tire inner air pressure (tire air pressure signals) transmitted from the front-wheel transmitter 21 and the rear-wheel transmitter 22 and the ID, and a tire air-pressure indicator 24 which performs a predetermined display based on the information received by the receiver 23.

Both the front-wheel transmitter 21 and the rear-wheel transmitter 22 can be fixed to the rims of the tire wheels, and are integrally formed with tire valves.

The receiver 23 can include an antenna 231, an RF circuit or reception circuit 232, a microcomputer 233, a power source circuit 234, and an input/output circuit 235. The power source circuit 234 can generate a constant voltage of, for example, 5 volts suitable as an input voltage for the microcomputer 233 from a voltage of, for example, 12 volts supplied from a vehicle-mounted battery. In the RF circuit 232, a signal of predetermined frequency is extracted from electric waves transmitted by a transmitter and received by the antenna 231, the signal is subject to the digital conversion and is input to the microcomputer 233. The microcomputer 233 can compare an air pressure indicated by the tire air pressure signal input from the RF circuit 232 and reference values, for example in two stages, and transmits the detection information to the tire air-pressure indicator 24 when the air pressure is lower than the predetermined value.

The tire air-pressure indicator 24 can constitute a part of the meter unit 14, and is controlled by a meter controller 26 or a communication controller 27 which performs a display control of meters such as a speed meter 25 mounted on the meter unit 14.

In the embodiment, the reference values of the tire air-pressure can be set to a value which is reduced from a prescribed air pressure by 10% and a value which is reduced from the prescribed air pressure by 20%, for example. When the tire air pressure is reduced from the prescribed air pressure by less than 10% and not less than 20%, it is determined that the air pressure is slightly lowered, and the microcomputer 233 can, for example, transmit a signal for flickering or illuminating a lamp, such as an LED or the like of the tire air-pressure indicator 24 of the meter unit 14 to the meter controller 26 via the communication controller 27. In response to this signal, the meter controller 26 can allow the tire air-pressure indicator 24 to perform a flickering operation.

Further in this example, when the tire air pressure becomes reduced from the prescribed air pressure by more than, for example, 20%, it is determined that the air pressure is considerably lowered, and the microcomputer 233 transmits a signal for continuously flickering the lamp of the tire air-pressure indicator 24 of the meter unit 14 to the meter controller 26 via the communication controller 27. In response to this signal, the meter controller 26 performs an alarm display by allowing the tire air-pressure indicator 24 to continuously emit light.

The tire air-pressure detection device may include a system fail indicator 28 which alarms by emitting light when a system fail occurs in the tire air-pressure detection device in addition to the tire air-pressure indicator 24.

Figure 4:
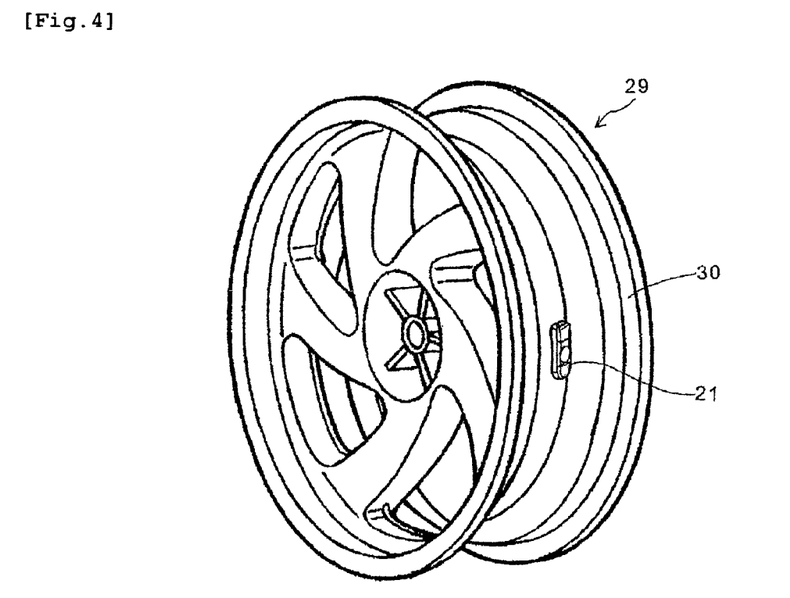
FIG. 4 is a perspective view of a tire wheel having an example of the tire air-pressure detection device.
Figure 5:
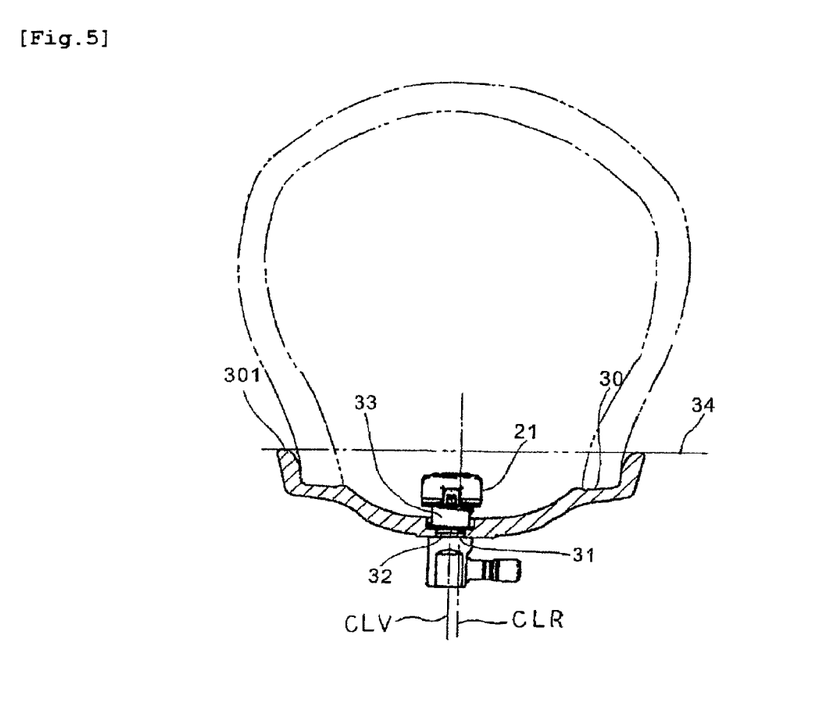
FIG. 5 illustrates a cross-sectional view of a rim of a tire wheel having an example of the tire air-pressure detection device.
Figure 6:
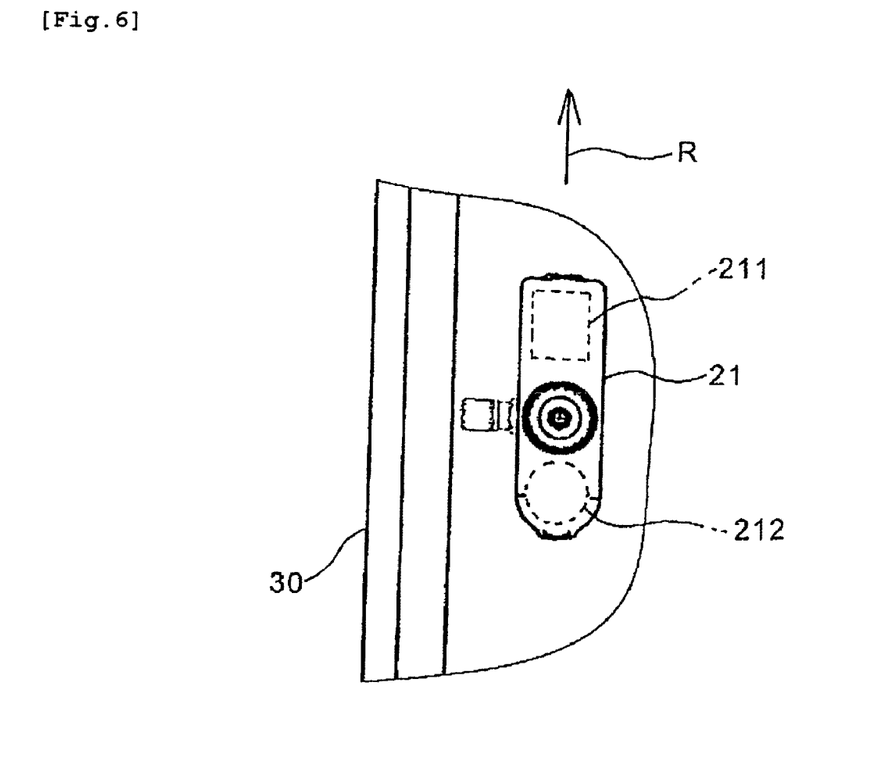
FIG. 6 is an enlarged view of part of an outer circumferential surface of the rim of the tire wheel.

FIG. 4 is a perspective view of the tire wheel showing a mounting mode of the transmitter, FIG. 5 is a cross-sectional view of the rim of the tire wheel, and FIG. 6 is an enlarged view of an essential part of an outer peripheral surface of the rim. Both the front-wheel transmitter 21 and the rear-wheel transmitter 22 of the tire air-pressure detection device are mounted on the rim of the tire wheel in the same manner. Therefore, the following explanation is made in view of the front-wheel transmitter 21 as a representative. The front-wheel transmitter 21 is of a valve integral type. That is, the front-wheel transmitter 21 can be integrally incorporated into a cylindrical body which houses a check valve or valve body therein thus constituting the tire air-pressure detection device.

The tire indicated by the broken line in FIG. 5 is mounted on the rim 30 of the tire wheel 29. As shown in FIG. 4 to FIG. 6, the front-wheel transmitter 21 is mounted on a small diameter, or widthwise center portion of the rim 30. As shown in FIG. 5, the front-wheel transmitter 21 can be arranged at a position slightly displaced from the widthwise center portion CLR of the rim 30; such position is indicated in this example by a center line CLV).

As shown in FIG. 5, the cylindrical valve body 31 which houses the check valve therein penetrates a through hole 32, which can be a tire valve mounting portion, which is formed in the rim 30 from the outside to the inside of the tire wheel 29, and a nut 33 which constitutes a connection member with the valve body 31 is threadedly engaged with a threaded portion of the valve body 31 which penetrates into the inside of the tire wheel 29. Therefore, this is an example of how the front-wheel transmitter 21 can be joined to the valve body 31. As a result, the front-wheel transmitter 21 is installed in the inside of the tire (not shown in the drawing) fitted in the tire wheel 29.

As shown in the example of FIG. 4 to FIG. 6, the front-wheel transmitter 21 can be mounted with the longitudinal direction thereof arranged along the circumferential direction of the tire wheel 29, which can be the rotational direction of the tire wheel 29 when the vehicle travels. Further, to prevent the front-wheel transmitter 21 from projecting from a line 34 which connects outer peripheral edge portions 301 of the rim 30, the front-wheel transmitter 21 is positioned within a region surrounded by the line 34 and the rim 30.

Further, as shown in FIG. 6, in this embodiment, the front-wheel transmitter 21 has an approximately longitudinal center portion thereof joined to the valve body 31. With respect to a sensor portion 211 and a battery 212 which supplies operational power to the sensor portion 211 which constitutes the front-wheel transmitter 21, the sensor portion 211 can be positioned on a front side in the rotational direction R of the tire wheel 29, and the battery 212 is set to be positioned on a rear side in the rotational direction R of the tire wheel 29. This is because that by positioning the battery 212 heavier than the sensor portion 211 on the rear side, it is possible to more easily suppress the vibrations of the front-wheel transmitter 21 when the tire wheel 29 is rotated, particularly at the time of acceleration. When it is necessary to suppress vibrations of the front-wheel transmitter 21, such as at the time of deceleration, the positional relationship between the battery 212 and the sensor portion 211 becomes opposite. That is, the battery 212 may be arranged in the direction opposite to the direction along which the tire wheel is accelerated.

Figure 7:
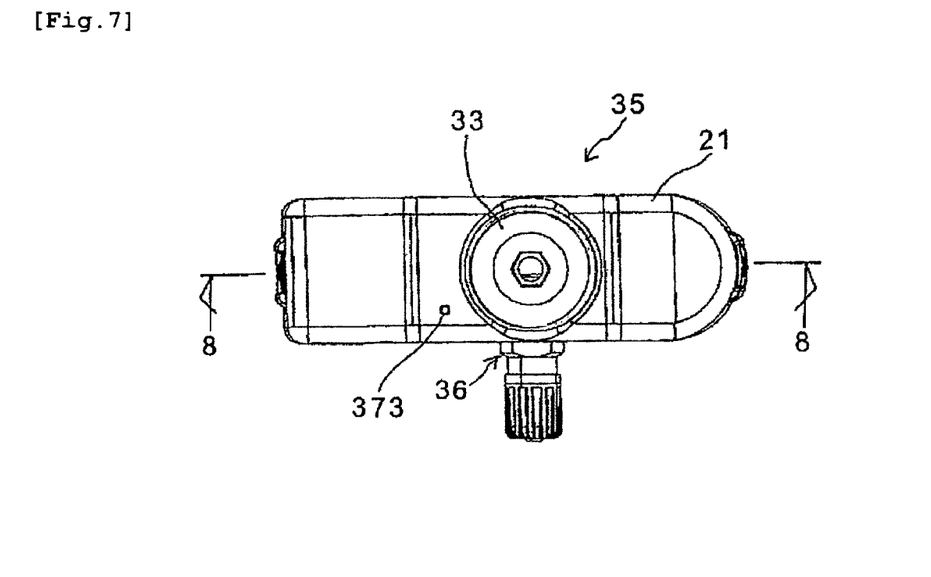
FIG. 7 is a plan view of the tire air-pressure detection device according to an embodiment of the invention.
Figure 8:
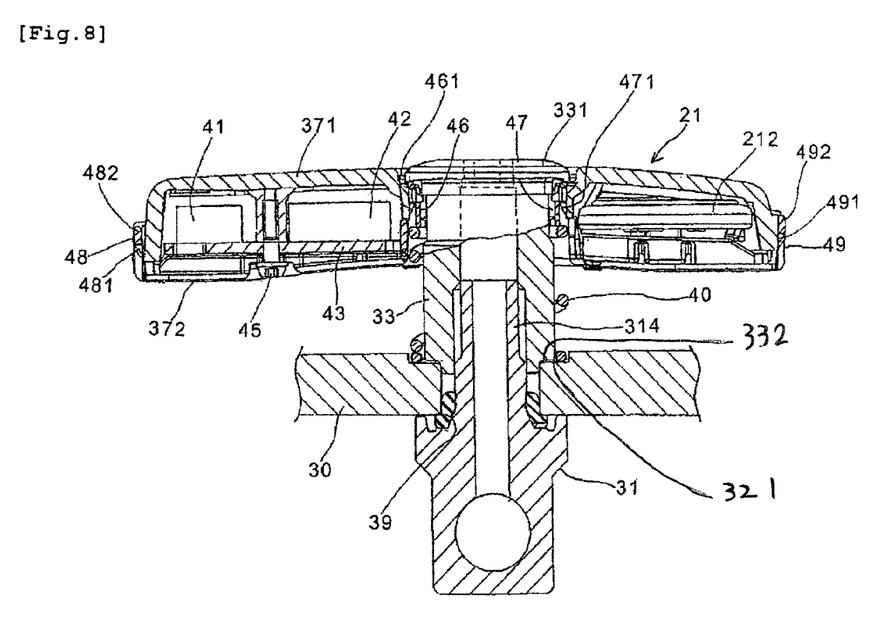
FIG. 8 is a cross-sectional view at a position 8-8 of FIG. 7.
Figure 9:
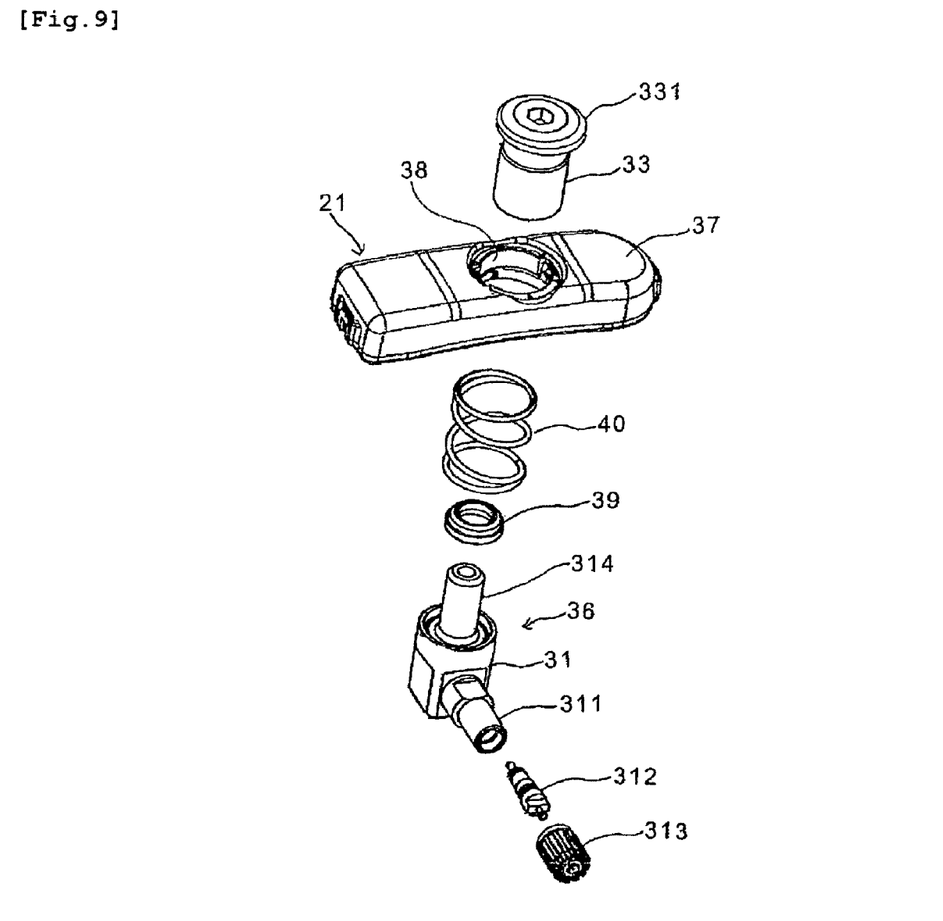
FIG. 9 is an exploded view of a tire air-pressure detection device according to the invention.
Figure 14:
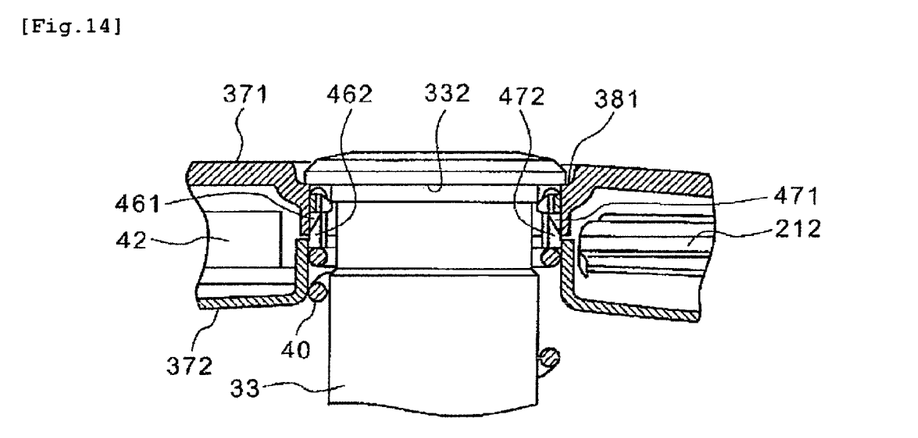
FIG. 14 is an enlarged cross-sectional view of part of the tire air-pressure detection device according to an embodiment of the invention.

FIG. 7 is a plan view of the tire air-pressure detection device, and FIG. 8 is an enlarged cross-sectional view at a position 8-8 in FIG. 7. FIG. 9 is an exploded view of the tire air-pressure detection device, and FIG. 14 is an enlarged cross-sectional view of an essential part of the tire air-pressure detection device. In FIG. 7 to FIG. 9 and FIG. 14, the tire air-pressure detection device 35 can include the front-wheel transmitter 21, a valve device 36, and the nut 33. The valve device 36 is constituted of the valve body 31 which is bent in an L-shape, a valve element or valve core 312 which is mounted in a horizontal portion 311 of the valve body 31, and a cap 313. The through hole 32 formed in the rim 30 allows the insertion of a vertical portion 314 of the valve body and, at the same time, a spring seat surface 321 which receives a lower end surface of a coil spring 40 and a stepped surface 332 formed on a lower end of the nut 33 is formed on an inner peripheral side (an upper side in FIG. 8) of the rim 30 in the through hole 32.

Threads are formed on an outer periphery of the vertical portion 314 of the valve body 31, and the nut 33 is threadedly engaged with the threads. A head portion 331 of the nut 33 is formed into a flange having a large diameter, and the diameter of the head portion 331 is set larger than a diameter of a hole (mounting hole) 38 formed in a center portion of the casing 37 of the front-wheel transmitter 21. Accordingly, when the nut 33 is inserted into the hole 38 of the casing 37 from above, the nut 33 can bring a jaw 333 of the head portion 331 into contact with an upper surface 381 of a stepped portion formed in an upper peripheral portion of the hole 38 of the casing 37 and hence, the positional relationship between the nut 33 and the casing 37 is determined.

In assembling the tire air-pressure detection device 35 into the rim 30, an annular sealing member 39 is fitted on an outer periphery of the vertical portion 314 of the valve body 31, the vertical portion 314 of the valve body 31 is made to penetrate the through hole 32 of the rim 30 from an outer peripheral side to an inner peripheral side of the tire wheel 29. Next, the nut 33 is made to penetrate the hole 38 formed in the casing 37 of the front-wheel transmitter 21 from above. Further, the nut 33 is threaded into the vertical portion 314 of the valve body 31 in a state that the nut 33 penetrates the coil spring 40. When the nut 33 is threaded to arrive at a predetermined position, the valve body 31 is pulled in the inward direction (toward an upper side in FIG. 8) of the rim 30 so that the sealing member 39 is compressed thus establishing sealing between the rim 30 and the valve body 31 by the sealing member 39. Then, the coil spring 40 generates a reaction force between the rim 30 and the casing 37 of the front-wheel transmitter 21 so as to increase the distance between the rim 30 and the casing 37 of the front-wheel transmitter 21. As a result, the casing 37 of the front-wheel transmitter 21 can be pushed to the head portion 331 side of the nut 33 so as to maintain the distance between the rim 30 and the front-wheel transmitter 21 at a predetermined value.

That is, the front-wheel transmitter 21 is not directly mounted on the rim 30, but is slidably held on the outer periphery of the nut 33 in a state that the front-wheel transmitter 21 is biased toward a head portion side of the nut 33 by the coil spring 40. Accordingly, it is possible to prevent the direct transmission of vibrations of the rim 30 to the front-wheel transmitter 21.

The casing 37 of the front-wheel transmitter 21 is constituted of a first casing portion 371 and a second casing portion 372. In the inside of the casing 37, the sensor portion 211 can be provided of a substrate 43 which mounts a transmission antenna 41 and a pressure sensor 42 thereon, and the battery 212 are housed.

The first casing portion 371 and the second casing portion 372 are joined to each other by a joint portion formed of hooks and hook holes. The first casing portion 371 and the second casing portion 372 are also joined to each other by a screw 45 which penetrates the substrate 43 after being inserted from the outside of the second casing portion 372 and is threaded into a boss 374 of the first casing portion 371.

The joint portion formed of the hook and the hook hole is arranged at two portions 46, 47 around the hole 38 formed in the center portion of the casing 37 and two portions 48, 49 at both longitudinal end portions of the casing 37. In the example shown in FIG. 8, hooks 461, 471 are arranged around the hole 38 formed in the center portion of the first casing portion 371, and hooks 481, 491 are arranged at both longitudinal ends of the first casing portion 371. On the other hand, longitudinal members 462, 472 having hook holes with which the hooks 461, 471 are engaged are arranged around the hole 38 formed in a center portion of the second casing portion 372 (further described later in conjunction with FIG. 10 and FIG. 11), and longitudinal members 482, 492 having hook holes with which the hooks 481, 491 are engaged are arranged at both longitudinal ends of the second casing portion 372. Here, an air hole 373 is formed in the first casing portion 371 so as to allow the inflow of air in the tire into the casing 37.

As shown in FIG. 8, the joint portions 46, 47 of the first casing portion 371 and the second casing portion 372 and the joint portions 48, 49 of the first casing portion 371 and the second casing portion 372 differ in position in the height direction (in the vertical direction in FIG. 8) of the casing 37 as can be clearly understood from the position of the hooks 461, 471 and the position of the hooks 481, 491. That is, the joint portions 46, 47 formed around the hole 38 formed in the center portion of the casing 37 are positioned higher than the joint portions 48, 49 positioned on both longitudinal ends of the casing 37. Due to such a configuration, even in a casing released state where the first casing portion 371 and the second casing portion 372 are deformed to an extent that the joint between the first casing portion 371 and the second casing portion 372 is released at the joint portions 48, 49 at both longitudinal ends of the casing 37, the joint portions 46, 47 at the center portion of the casing 37 can maintain the joint.

Figure 10:
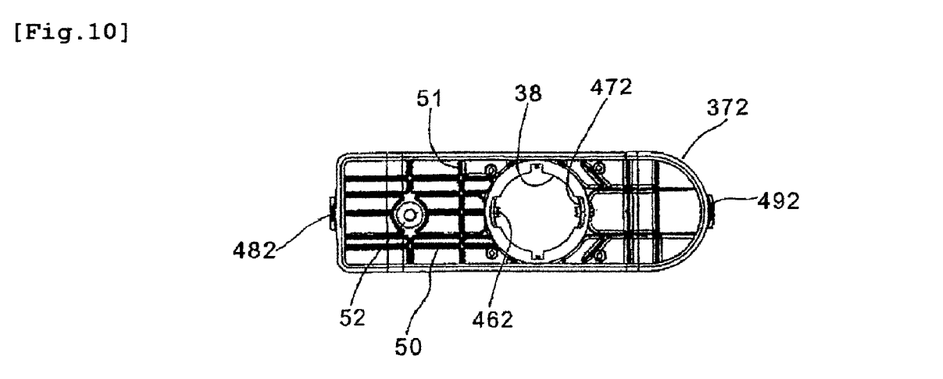
FIG. 10 illustrates a plan view of an example of a second casing portion.
Figure 11:
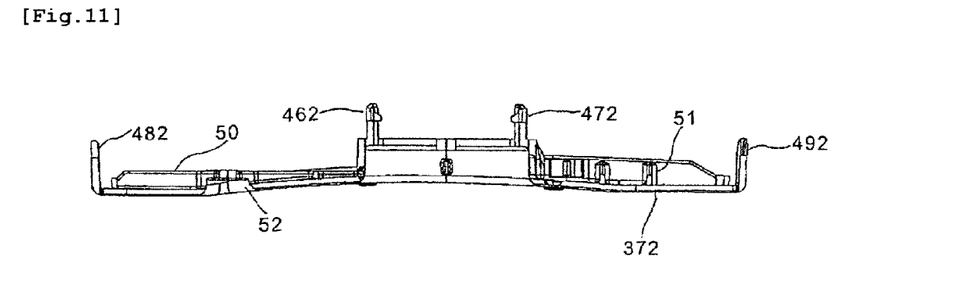
FIG. 11 is a cross-sectional view of this example of the second casing portion.

The casing 37 of the front-wheel transmitter 21 is further explained. FIG. 10 is a plan view of the second casing portion, and the FIG. 11 is a side view of the second casing portion. With respect to the second casing portion 372, as shown in FIG. 10, the hole 38 through which the nut 33 passes can be arranged at a position on a slightly right side of the center portion, and longitudinal members 462, 472 having hook holes are raised around the hole 38. The longitudinal members 482, 492 are raised on both longitudinal ends of the second casing portion 372. All of the longitudinal members 462, 472, 482, 492 can be formed of a projecting portion formed on the second casing portion 372 in a gate shape to provide the hook hole at a center portion thereof. The longitudinal members 462, 472, 482, 492 are aligned on one straight line in the longitudinal direction of the casing 37. The second casing portion 372 is a thin-wall-thickness part, and includes a plurality of longitudinal ribs 50 and a plurality of lateral ribs 51 for increasing a strength thereof. The second casing portion 372 also has a boss 52 which receives the head portion of the screw 45.

In the example shown in FIG. 10, the longitudinal members 482, 462, 472, 492 are arranged to be aligned on one straight line such that the joint portions 48, 46, 47, 49 are aligned in the longitudinal direction at the widthwise center of the casing 37. However, the arrangement of the joint portions 48, 46, 47, 49 is not limited to such arrangement. For example, the joint portions 48, 49 may be arranged to be displaced from each other in the widthwise direction of the casing 37 using the center of the hole 38 as an axis of symmetry. That is, in FIG. 10, the longitudinal members 482, 492 are arranged such that the longitudinal member 482 is displaced toward an upper portion of the drawing, and the longitudinal member 492 is displaced toward a lower portion of the drawing.

Figure 12:
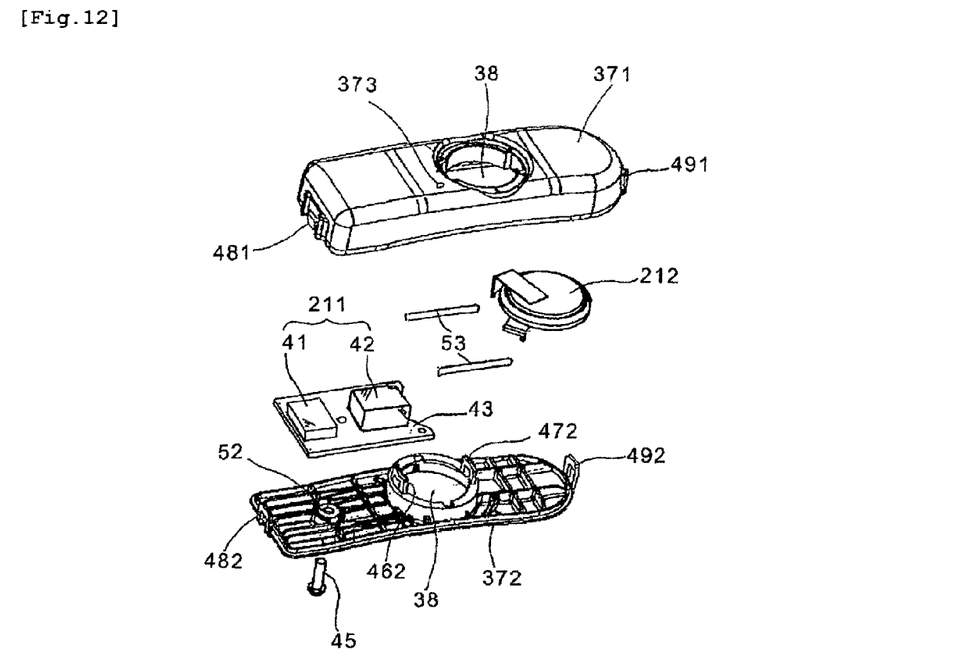
FIG. 12 illustrates an exploded perspective view of an embodiment of a front-wheel transmitter.

FIG. 12 is an exploded perspective view of the front-wheel transmitter 21. The substrate 43 which mounts the sensor portion 211 formed of the transmission antenna 41 and the pressure sensor 42 thereon is arranged on one side of the second casing portion 372, and the battery 212 is arranged on the other side of the second casing portion 372 while sandwiching the hole 38 formed on the center portion of the second casing portion 372 between the substrate 43 and the battery 212. The substrate 43 and the battery 212 are connected with each other using a pair of blades 53. The second casing portion 372 can be covered with the first casing portion 371, and the hook and the hook hole can be engaged with each other at the above-mentioned four portions. As a final step, the second casing portion 372 and the first casing portion 371 are fastened to each other and the substrate 43 is fixed to the casing 37 by the screw 45.

Figure 13:
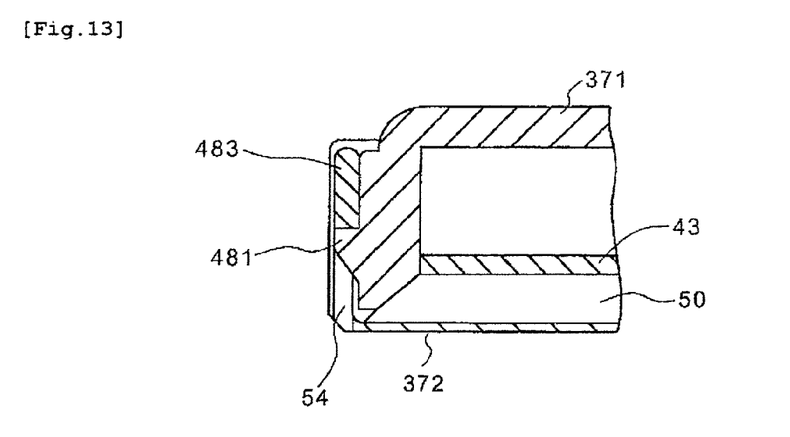
FIG. 13 is an enlarged cross-sectional view showing an example of a joint portion of a casing of a pressure detection unit.

FIG. 13 is an enlarged cross-sectional view showing the joint portion of the casing 37. A hook hole 54 is formed in a longitudinal member 483. The first casing portion 371 and the second casing portion 372 are tightly joined to each other due to the engagement of the hook hole 54 and the hook 481 of the first casing portion 371.

The descriptions of the various embodiments of the invention which are noted above are intended to be exemplary only. Numerous modifications and other alternative of embodiments of the invention may be implemented, and still remain within the spirit and scope of the invention. For proper understanding of the metes and bounds of the invention, reference should be made to the appended claims.

DESCRIPTION OF REFERENCE NUMERALS AND SIGNS

1: motorcycle
4: rear wheel
7: front wheel
14: meter unit
21: front-wheel transmitter
22: rear-wheel transmitter
23: receiver
24: tire air-pressure indicator
29: tire wheel
30: wheel rim
31: valve body
33: nut
37: casing
38: mounting hole
40: coil spring
41: antenna
42: pressure sensor
43: substrate
46, 47, 48, 49: joint portions
211: sensor portion
212: battery
371: first casing portion
372: second casing portion
461, 471, 481, 491: hook

We claim:

1. A tire pressure detection device, comprising:
an elongated casing having a first casing portion and a second casing portion, configured to house a pressure sensor and battery therein, said casing also including a mounting hole for accommodating a connection member configured to connect the casing to a tire valve, said mounting hole disposed at an approximately longitudinal center portion thereof,
wherein the first casing portion and the second casing portion are joined to each other by joint portions comprising a hook formed on one of the first casing portion and the second casing portion, and a hook hole formed in another of the first casing portion and the second casing portion, and wherein the joint portions are located around the mounting hole and at both longitudinal ends of the casing, and wherein the casing is configured such that a tire valve penetrates a rim of a tire wheel from an outside to an inside thereof,
wherein the connection member comprises a nut which is configured to be threadedly engaged with a threaded portion of an outer periphery of a cylindrical body of the tire valve, and wherein the nut comprises a flange portion formed on a head portion thereof, and a cylindrical portion extending from the flange portion, and wherein the cylindrical portion is slidably fitted in a mounting hole formed in the casing, wherein a coil spring is configured to bias the pressure detection unit away from the rim.

2. A tire pressure detection device according to claim 1, wherein the casing includes a first longitudinal side which houses the pressure sensor, and a second longitudinal side which houses the battery, and wherein the pressure sensor and battery are disposed on opposite sides of the mounting hole.

3. A tire pressure detection device according to claim 1, wherein the joint portions of the casing are disposed along a longitudinal direction of the casing at a widthwise center portion thereof.

4. A tire pressure detection device according to claim 1, wherein the pressure sensor, the battery, and the casing comprise a pressure detection unit, and wherein the pressure detection unit is configured to be connected to a tire valve in a spaced-apart manner from a mounting portion of the tire valve on the rim by a predetermined distance, wherein the predetermined distance is configured to prevent the pressure detection unit from projecting outwardly from outermost peripheries of the tire wheel.

5. A tire pressure detection device according to claim 1, wherein the pressure sensor, the casing, and the battery comprise a pressure detection unit, and wherein the pressure detection unit is configured to be mounted on the rim of the tire wheel by the tire valve such that the pressure sensor is disposed on a front side with respect to an advancing rotational direction of the tire wheel, and wherein the battery is disposed on a rear side with respect to an advancing rotational direction of the tire wheel.

6. A tire pressure detection device according to claim 1, wherein the pressure sensor, the battery, and casing comprise a pressure detection unit, and wherein the pressure detection unit is configured to be disposed at an approximate center in a widthwise direction of the tire wheel.

7. A tire pressure detection device according to claim 1, wherein the coil spring is disposed between the rim and the pressure detection unit.

8. A tire pressure detection device according to claim 1, wherein the joint portion disposed around the mounting hole and the joint portion disposed at longitudinal ends of the casing are provided at positions which are different from each other in a height direction of the casing.

9. A tire pressure detection device, comprising:
elongated casing means for housing a pressure sensor and battery therein, said elongated casing means including a first casing portion and a second casing portion, and a mounting hole for accommodating a connection member for connecting the casing means to a tire valve, said mounting hole disposed at an approximately longitudinal center portion thereof,
wherein the first casing portion and the second casing portion are joined to each other by joining means for joining the first casing portion and the second casing portion, said joining means comprising a hook formed on one of the first casing portion and the second casing portion, and a hook hole formed in another of the first casing portion and the second casing portion, and wherein the joining means are located around the mounting hole and at both longitudinal ends of the casing means, and wherein the casing means enables a tire valve to penetrate a rim of a tire wheel from an outside to an inside thereof,
wherein the connection member comprises attachment means for engagement with an outer periphery of a cylindrical body of the tire valve, and wherein the attachment means comprises a flange portion formed on a head portion thereof, and a cylindrical portion extending from the flange portion, and wherein the cylindrical portion is slideably fitted in a mounting hole formed in the casing, wherein a coil spring is configured to bias the pressure detection means away from the rim.

10. A tire pressure detection device according to claim 9, wherein the casing means includes a first longitudinal side for housing the pressure sensor, and a second longitudinal side for housing the battery, and wherein the pressure sensor and battery are disposed on opposite sides of the mounting hole.

11. A tire pressure detection device according to claim 9, wherein the joining means are disposed along a longitudinal direction of the casing means at a widthwise center portion thereof.

12. A tire pressure detection device according to claim 9, wherein the pressure sensor, the battery, and the casing means comprise a pressure detection means for pressure detection, and wherein the pressure detection means is also for connection to a tire valve in a spaced-apart manner from a mounting portion of the tire valve on the rim by a predetermined distance, and wherein the predetermined distance prevents the pressure detection unit from projecting outwardly from outermost peripheries of the tire wheel.

13. A tire pressure detection device according to claim 9, wherein the pressure sensor, the casing means, and the battery comprise a pressure detection means for pressure detection, and wherein the pressure detection means is mounted on the rim of the tire wheel by the tire valve such that the pressure sensor is disposed on a front side with respect to an advancing rotational direction of the tire wheel, and wherein the battery is disposed on a rear side with respect to an advancing rotational direction of the tire wheel.

14. A tire pressure detection device according to claim 9, wherein the pressure sensor, the battery, and the casing means comprise a pressure detection means for pressure detection, and wherein the pressure detection means is disposed at an approximate center in a widthwise direction of the tire wheel.

15. A tire pressure detection device according to claim 9, wherein the coil spring is disposed between the rim and the pressure detection means.

16. A tire pressure detection device according to claim 9, wherein the joining means disposed around the mounting hole and the joining means disposed around the mounting hole and the joining means disposed at longitudinal ends of the casing means are provided at positions which are different from each other in a height direction of the casing.

17. A method of attaching a tire pressure detection device to a rim of a tire wheel, comprising:
providing an elongated casing having a first casing portion and a second casing portion, said casing being configured to house a pressure sensor and a battery therein, said casing also including a mounting hole for accommodating a connection member configured to connect casing to a tire valve, the mounting hole disposed at an approximate longitudinal center portion thereof;
joining the first casing portion and second portion to each other by engaging a hook formed on one of the first casing portion and the second casing portion with a hook hole formed on another of the first casing portion and the second casing portion, and wherein the joint portions are located around the mounting hole and that longitudinal ends of the casing; and
attaching the joined the joint portions to a tire valve on the rim of the tire wheel,
wherein the connection member comprises a nut which is configured to be threadedly engaged with a threaded portion of an outer periphery of a cylindrical body of the tire valve, and wherein the nut comprises a flange portion formed on a head portion thereof, and a cylindrical portion extending from the flange portion, and wherein the cylindrical portion is slidably fitted in a mounting hole formed in the casing, wherein a coil spring is configured to bias the pressure detection unit away from the rim.

* * * * *